United States Patent [19]
Orkin et al.

[11] 4,053,665
[45] * Oct. 11, 1977

[54] MOLDED PLASTIC BEARING ASSEMBLY

[75] Inventors: Stanley S. Orkin, Rockville; Edward John Nagy, Windsor, both of Conn.

[73] Assignee: Kamatics Corporation, Bloomfield, Conn.

[*] Notice: The portion of the term of this patent subsequent to Apr. 23, 1991, has been disclaimed.

[21] Appl. No.: 680,879

[22] Filed: Apr. 27, 1976

Related U.S. Application Data

[60] Division of Ser. No. 601,956, Aug. 4, 1975, which is a division of Ser. No. 452,359, March 18, 1974, Pat. No. 3,929,396, which is a continuation-in-part of Ser. No. 241,007, April 4, 1972, Pat. No. 3,806,216.

[51] Int. Cl.$^2$ .................. B05D 3/02; F16C 33/12
[52] U.S. Cl. .................. 427/385 C; 252/12; 308/72; 308/240; 308/238; 308/241; 427/388 D; 526/292; 526/298; 526/312

[58] Field of Search ............ 252/12, 12.2, 12.4, 252/126; 308/72, 238, 240, 241; 427/377, 388 D, 385 C; 428/323, 334, 335, 339, 421, 422, 500; 526/292, 298, 312

[56] References Cited
U.S. PATENT DOCUMENTS

| | | | |
|---|---|---|---|
| 3,342,667 | 9/1967 | Berlinghof | 161/186 |
| 3,496,103 | 2/1970 | Gisser et al. | 252/12 |
| 3,554,913 | 1/1971 | Gisser et al. | 252/56 |
| 3,806,216 | 4/1974 | Orkin et al. | 308/241 |
| 3,929,396 | 12/1975 | Orkin et al. | 308/241 |

*Primary Examiner*—Michael R. Lusignan
*Attorney, Agent, or Firm*—Cushman, Darby & Cushman

[57] ABSTRACT

A bearing assembly comprises two engaging members movable relative to one another. One of said members has a bearing surface made of metal or ceramic coated with a thin film of a parting agent, and the other bearing surface is a cured mixture of a curable acrylate composition and particulate polytetrafluoroethylene.

3 Claims, 12 Drawing Figures

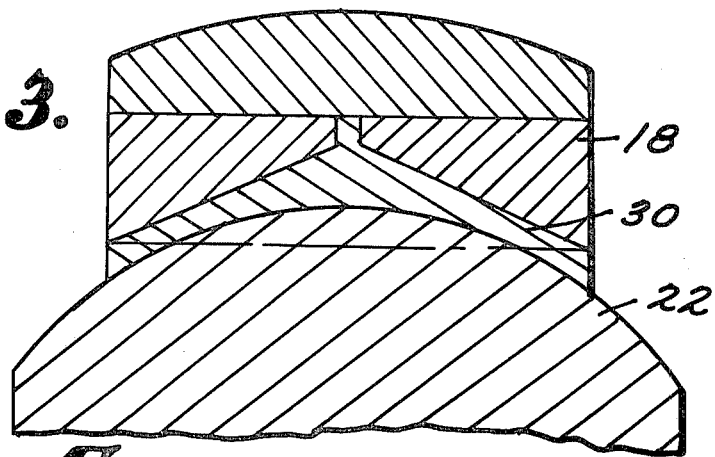
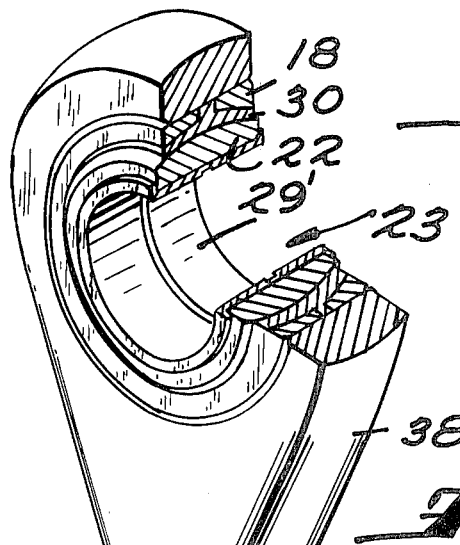
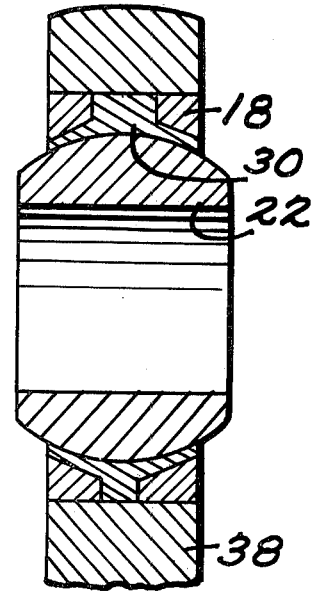
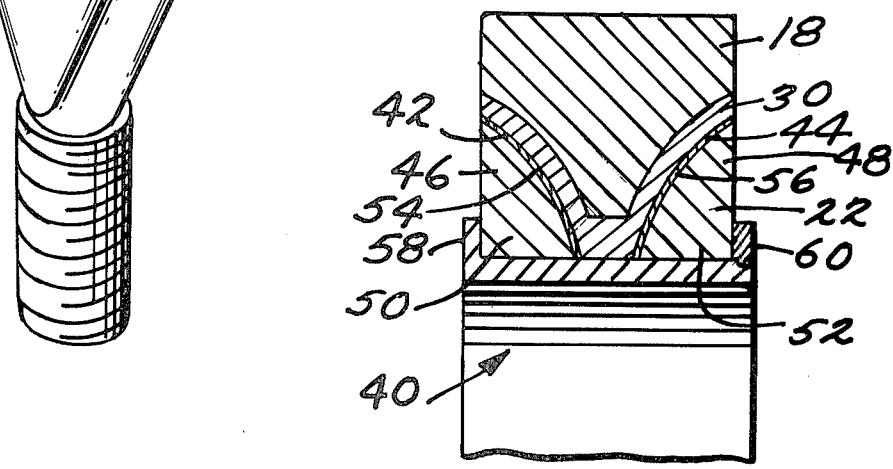

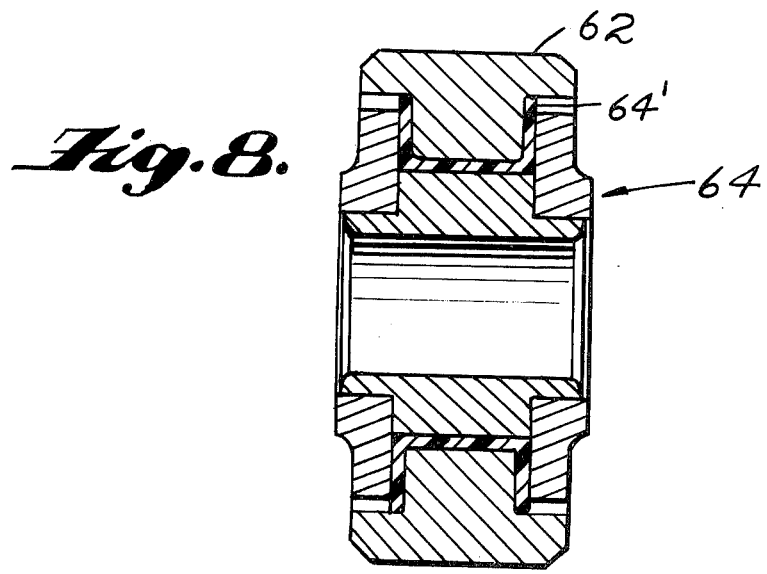
*Fig.8.*
*Fig.9.* *Fig.10.* *Fig.11.*
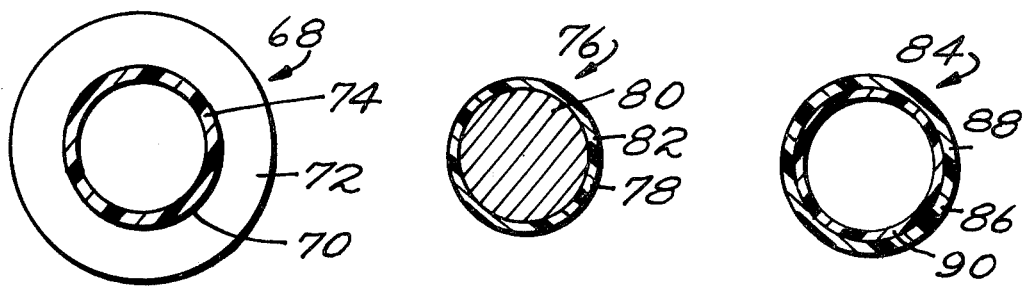
*Fig.12.*
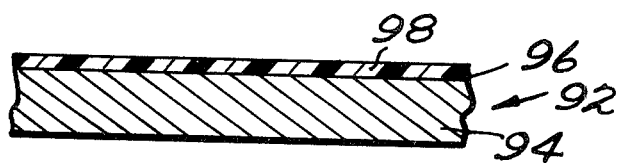

MOLDED PLASTIC BEARING ASSEMBLY

This is a division, of application Ser. No. 601,956 filed Aug. 4, 1975, which is a division of application Ser. No. 452,359, filed Mar. 18, 1974, now U.S. Pat. No. 3,929,396, which in turn is a continuation-in-part of application Ser. No. 241,007, filed Apr. 4, 1972, now U.S. Pat. No. 3,806,216.

The present invention relates to a molded self-lubricating bearing assembly and particularly to a self-lubricating bearing assembly capable of absorbing radial, axial and moment loading, individually, or in combination.

In the past, efforts to produce a molded bearing assembly comprising an inner bearing member and a molded outer plastic race have not been altogether satisfactory. In certain instances, excessive looseness between the freely rotatable inner bearing member and the plastic outer race is experienced. In other instances, the plastic material after injection about the inner bearing member tends to shrink around the inner bearing member, thereby causing a lock up of the plastic race on the inner bearing member. This latter phenomenon seriously interferes with the normal desired relative movement between the bearing members.

Representative of prior art molded bearing assemblies include those described in U.S. Pat. Nos. 2,970,869 and 3,094,376 to Thomas and 3,287,071 to Tucker. In accordance with Thomas' U.S. Pat. No. 2,970,869, a plastic material is injected under pressure within a housing enclosing a member so that the plastic conforms to the member and on hardening forms both a rigid supporting backing and a bearing surface for the member. Plastic materials disclosed for use in this patent are polyethylene, phenolic impregnated glass fibrous material, nylon and a phenolic-polyethylene impregnated glass fibrous material.

In Thomas' U.S. Pat. No. 3,094,376, a relatively thin coating of polytetrafluoroethylene or nylon is applied to the surface of a ball retained in a housing. A hardenable backing material is then injected into the housing, around the polytetrafluoroethylene or nylon, under heat and pressure to entirely fill the space within the housing so that ultimately there is no relative movement between the hardened backing material and the polytetrafluoroethylene or nylon, the latter being in rotative engagement with the ball. Materials used to form the injected backing member are phenolic impregnated glass fibrous material, nylon and a phenolic-polyethylene impregnated glass fibrous material.

An even more recent development in the molded bearing art is U.S. Pat. No. 3,287,071 to Tucker who injects, under a pressure of about 1000 psi, a heated, liquefied low shrink plastic material about an inner bearing member disposed within and spaced from a housing member so that when the plastic material is set it forms a race for the inner bearing member and is in line-to-line rotatable engagement therewith but in nonrotative engagement with the wall surface of the housing, generally by means of a keying element extending radially through the housing member and integral with the plastic race. The low shrink plastic material disclosed in this patent is 20% glass filled nylon.

Contrary to these prior art molded bearing assemblies which utilize, as the plastic material for producing a molded race or bearing member, a polytetrafluoroethylene or a nylon based material which requires the application of heat and/or elevated pressure in order to liquefy and to inject the same into the space surrounding the inner member, the present invention provides a bearing assembly utilizing an acrylate composition which is liquid at ambient temperature and pressure, thus permitting the formation of the outer bearing member therefrom under these conditions. Advantageously, the production of the outer bearing member at ambient temperature eliminates the absolute need to heat the plastic material to a molten state which heating operation is required in prior art methods of producing molded plastic bearings. A significant economy in production costs can thus be achieved. Further, the use of the acrylate composition in the present invention avoids the need for the addition to the plastic material of solvents to liquefy the same, as is required in prior art compositions, thus avoiding the possibility of adverse after effects resulting from driving off the solvent during the curing operation. Such adverse effects can be reflected in the introduction of undesirable play between the bearing members and/or the presence of voids in portions of the cured material.

Moreover, the use of the acrylate composition in the present invention has been found particularly advantageous, since the composition remains in a liquid state until it is either deprived of oxygen or raised to an elevated temperature, thus easing handling, storage and manufacturing operations involving the same and permitting, for instance, the use of injection pressures as low as about 0.25 lbs/in$^2$, when an injection operation is desired. Thus, the present invention represents a significant departure from the prior art molded bearing assemblies and from prior art methods of producing the same, while achieving equal and even superior results.

More particularly, the present invention relates to a bearing assembly comprising an inner and an outer coengaging bearing members movable relative to one another, said inner bearing member having a bearing surface made of a member selected from the group consisting of metal and ceramic and said outer bearing being produced from a mixture of a curable acrylic composition and a solid lubricant, organic or inorganic, in particulate form. In an advantageous embodiment of the present invention the inner bearing member comprises a ceramic bearing surface provided by a thin ceramic coating on a metal substrate, the thickness of the said ceramic coating ranging from 0.0001 to 0.02 inches.

Generally, the curable acrylate is present in amounts of about 50-70, preferably about 60 percent by weight of said mixture, the remainder being essentially said particulate solid lubricant which can be, for instance, polytetrafluoroethylene, preferably in flock form, molybdenum disulfide, graphite fibers, silver powder, lead powder, fiberglass flock and others.

The curable acrylate composition usefully employed in the present invention is selected from the group consisting of a. a mixture of a major amount of a liquid acrylic ester selected from the group consisting of di-, tri- and tetra-esters of an acrylic acid and a polyhydric alcohol, a minor amount of a low molecular weight prepolymer of an ester of a low molecular weight alcohol having a terminal vinyl group and an aromatic polycarboxylic acid in solution in said acrylic ester and an organic amide of the formula f. a mixture of a monomer of the formula

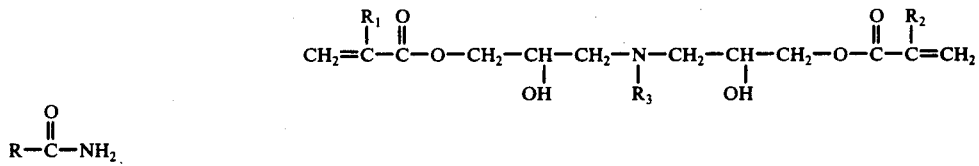

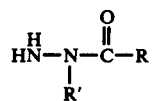

wherein R is selected from the group consisting of hydrogen and aliphatic hydrocarbon of 1-20 carbon atoms in an amount sufficient to copolymerize said acrylic ester and prepolymer, b. a mixture of acrylic ester monomer, a peroxidic initiator in an amount sufficient to initiate polymerization of said monomer and an aminoalkoxyalkylamine of the formula $R_1$—$N(H)R_2$—$OR_3$—$_xN(H)R_4$ wherein $x$ is an integer of 1-6 inclusive, each of $R_1$ and $R_4$ is selected from the group consisting of hydrogen and lower alkyl and each of $R_2$ and $R_3$ is a lower alkyl linking bridge between N and O, in an amount sufficient to accelerate the polymerization of said monomer, c. a mixture of an acrylic ester of an alkyl amino alkyl alcohol and an effective amount of a hydroperoxide catalyst, said acrylic ester having the formula

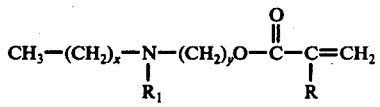

wherein $x$ is an integer of 0-5 inclusive, $y$ is an integer of 1-6 inclusive, R is selected from the group consisting of hydrogen, halogen, hydroxy, cyano and lower alkyl and $R_1$ is selected from the group consisting of hydrogen and alkyl having 1-6 carbon atoms, d. a mixture of a liquid acrylic ester monomer selected from the group consisting of diesters of an acrylic acid and a polyhydric alcohol, acrylic esters of cyclic ether alcohols, acrylic esters of amino alcohols and mixtures thereof, a peroxidic initiator and an oxyalkylamine of the formula $(H)_mN[(CH_2)_x(OR_1)_yOR_2]_n$ wherein $m$ and $n$ are each integers of 1 to 2 inclusive, the total of $m$ and $n$ is 3, $x$ is an integer of 1 to 6 inclusive, $y$ is an integer of 0 to 6 inclusive, $R_1$ is lower alkyl and $R_2$ is hydrogen or lower alkyl, e. a mixture of an acrylic ester monomer selected from the group consisting of di-, tri- and tetraesters of an acrylic acid and a polyhydric alcohol, acrylic esters of cyclic ether alcohols, acrylic esters of amino alcohols and mixtures thereof, a peroxidic initiator in an amount sufficient to initiate polymerization of said monomer and a member selected from the group consisting of rhodanine and a hydrazide of the formula $$\underset{\underset{R'}{|}}{HN}-N-\overset{\overset{O}{\|}}{C}-R$$

wherein R and R' are selected from separate groups and an interconnected group forming a cyclic ring. R is further selected from the group consisting of hydrogen, alkyl, cycloalkyl, aryl and alkoxy and R' is selected from the group consisting of hydrogen, alkyl, cycloalkyl, acyl and dithiocarbonyl in an amount sufficient to accelerate the polymerization of said monomer; and wherein $R_1$ and $R_2$ are selected from the group consisting of hydrogen and lower alkyl and $R_3$ is selected from the group consisting of lower alkyl, lower hydroxyalkyl, cyano and lower cyanoalkyl; at least one equivalent of an acid for each equivalent of said monomer, said acid being selected from the group consisting of acrylic acid and lower alkyl acrylic acids; an initiator selected from the group consisting of t-butyl perbenzoate, t-butyl peracetate and di-t-butyl diperphthalate, said initiator being present in an amount sufficient to initiate the polymerization of said monomer; a trihydroxy benzene inhibitor and an accelerator selected from the group consisting of benzhydrazide and N-aminorhodanine.

In one embodiment of the present invention, in the acrylate composition (a) defined above, the liquid acrylic ester employed is well known and includes, for instance, ethylene glycol dimethacrylate, diethylene glycol dimethacrylate, triethylene glycol dimethacrylate, tetraethylene glycol dimethacrylate, polyethylene glycol dimethacrylate, dipropylene glycol dimethacrylate, tetraethylene glycol diacrylate, tetraethylene glycol dichloracrylate, glycerol trimethacrylate and pentaerythritol tetramethacrylate. Preferably, the esters are those of an acrylic acid and a polyhydric alcohol wherein the acrylic acid has the formula $CH_2=C(R)$—COOH wherein R is selected from the group consisting of hydrogen, lower alkyl, such as methyl, and halogen, such as chlorine, and the polyhydric alcohol has the formula $R(OH)_x$ wherein $x$ is 2 - 4 and R is alkyl or alkoxy. Representative polyols include the di-, tri-, and tetra-methylol hydrocarbons and the ethylene oxide, propylene oxide, butylene oxide and other higher alkylene oxide condensation products such as the ethylene oxide condensation products of the formula $HO$—$CH_2CH_2(OCH_2CH_2)_mOH$ where $m$ is 0 - 10. Such esters include, for instance, the polyesters of acrylic, methacrylic or chloracrylic acids and glycerol, trimethylolpropane, trimethylol methane and pentaerythritol.

Useful prepolymers include the partial polymerization products of an ester of an ethylenically unsaturated low molecular weight alcohol having a terminal vinyl group, such as allyl alcohol, 4-hydroxy-butene-1, 2-methyl-1-hydroxy-propene-1, and hydroxyoctene-1, and an aromatic polycarboxylic acid such as phthalic, isophthalic, terephthalic, mellitic, and naphthalene dicarboxylic acids. The prepolymers include, for instance, those of diallylphthalate, diallyl isophthalate, triallyl trimellitate and diallyltrimellitate. Preferably, the prepolymer has the formula

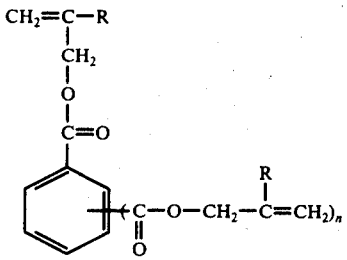

wherein R is hydrogen or methyl and n is 1 - 2. The prepolymer can be present in amounts of about 5 - 60 weight percent, preferably about 15 - 30 weight percent of the acrylate composition. Amounts of about 5 - 20 weight percent can also be employed.

Representative organic amides employed as a catalyst include formamide, acetamide, propionamide, amides derived from naturally occurring $C_{12}$ - $C_{20}$ fatty acids such as palmitic, stearic, oleic and tallow fatty acids, cyclohexyl carboxylic acid and alkyl substituted cyclohexyl carboxyl acid amides, and cyclohexyl hexanoic acid amide. The amide can be present in amounts of 0.1 - 10% of the acrylate composition.

In another embodiment of the present invention, in the acrylate composition (b) defined above, the acrylic ester monomer can be, for instance, an acrylic diester of ethylene glycol, an acrylic ester of a cyclic ether alcohol, an acrylic ester of an amino alcohol and mixtures thereof or mixtures of the above with other vinylic monomers such as allylic monomers. Representative acrylic ester monomers include isobutyl methacrylate, n-butyl methacrylate, mixed mono- and di-methacrylates of 2,2,4-trimethylpentanedio, tetrahydrofurfuryl-methacrylate, polyethylene glycol dimethacrylate, cyclohexyl methacrylate and dimethylaminoethyl methacrylate.

The peroxidic catalyst, employed usually in amounts of about 0.1 - 10 or 15 percent by weight of the acrylate composition, includes for instance cumene hydroperoxide, t-butyl hydroperoxide, methylethylketone hydroperoxide or peroxide, tetralin hydroperoxide, benzoyl peroxide, lauroyl peroxide and diteritary butyl diperphthalate.

Useful aminoalkoxyalkylamines include, for instance, N,N'-dimethyl triethylene glycol diamine, N,N'-diethyl diethylene glycol diamine, N,N'-diethyl hexaethylene glycol diamine, di-6-(methylamino) hexyl ether of 1,6-hexanediol, di-6-(hexylamino) octyl ether of ethylene glycol, methylaminomethyloxyhexylaminohexane, aminopropoxyethyl amine, aminomethoxypropyl amine, methylaminomethoxypropyl amine, aminomethoxymethyl amine, hexylaminohexyloxyhexyl amine, 2-aminoethoxy-3,4-dimethyl hexyl amine, methylaminobutoxybutoxy amine, aminoethoxyethoxyhexyl amine and aminobutoxyhexyloxyhexyloxy butyl amine. The aminoalkyloxyalkylamine accelerator can be present in amounts of about 0.011 - 10 percent by weight of the acrylate composition.

In a further embodiment of the present invention, in the acrylate composition (c) defined above, the acrylic ester includes, for instance, butylaminoethyl methacrylate, dimethyl aminoethyl cyanoacrylate or methacrylate or chloroacrylate, dihexyl aminomethyl acrylate, amylaminoethyl ethacrylate, di(t-butyl) aminoethyl methacrylate, di(t-butyl) aminohexyl methacrylate, hexylaminohexyl pentacrylate, methylaminomethyl methacrylate, as well as other esters of acrylic acids and alkylaminoalkanols.

Representative hydroperoxide catalysts include cumene hydroperoxide, t-butyl hydroperoxide, methylethylketone hydroperoxide, tetralin hydroperoxide and 2,5-dimethylhexyl-2,5-dihydroperoxide. The catalyst is present generally in amounts of about 0.1 - 15 percent by weight of said acrylate composition.

In yet another embodiment of the present invention, in the acrylate composition (d) defined above, the liquid acrylic ester monomer can be that employed, for instance, in acrylate compositions of (a), (b) and (c).

Representative oxyalkylamines include, for instance, diglycol amine, di-(triethylene glycol) amine and other di-(polyethylene glycol) amines including di-(hexaethylene glycol) amine, methoxypropyl amine, hydroxypropyl amine, methoxymethyl amine, hexyloxyhexyl amine, 2-ethoxy-3,4-dimethylhexyl amine, ethoxyethoxyethoxyethoxyethoxyethyl amine, butoxybutoxy amine, ethoxyethoxyhexyl amine, hydroxyhexyloxyhexyloxy butyl amine, di-(hydroxybutoxybutoxy butyl) amine and di-(methoxypropyl) amine. The oxyalkylamine accelerator can be present in amounts of about 0.1 - 10 percent or more by weight of the acrylate composition.

Examples of suitable peroxidic initiators include cumene hydroperoxide, t-butyl hydroperoxide, methylethylketone hydroperoxide or peroxide, tetralin hydroperoxide, benzoyl peroxide, lauroyl peroxide and ditertiary butyl diperphthalate. The initiator is present generally in amounts 0.1 - 10 or 15 percent by weight of the acrylate composition.

In a further embodiment of the present invention, in the acrylate composition (e) defined above, the acrylic ester monomer can also be that employed, for instance, in acrylate compositions (a), (b) and (c).

Useful accelerators include rhodanine and organic hydrazides having the formula

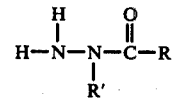

wherein R selected from the group consisting of hydrogen, alkyl, cycloalkyl, aryl and alkoxy and R' is selected from the group consisting of hydrogen, alkyl, cycloalkyl, acyl and dithiocarbonyl. The group R and R' can be connected to each other directly or indirectly through other atoms or groups to form a ring system, as in N-amino hodanine

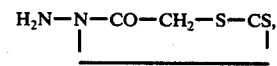

N-aminourazole

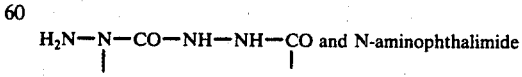 and N-aminophthalimide

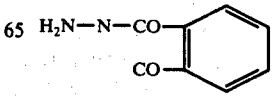

Thus R and R' can constitute the ring structure of a cyclic amide such as the ring structure of rhodanine, glyoxalylurea, mesoxalylurea, alloxanic acid, pyrazolone and phenazone. As further examples, R and R' can be separately selected from hydrogen and $C_1$ to $C_{20}$ or higher aliphatic alkyl or cycloalkyl groups, including the unsaturated aliphatic forms such as alkenyl, alkdienyl, alkenylcycloalkyl, and the like, e.g., methyl, heptenyl, hexadecenyl, dodecadienyl, eicosyl, cyclohexyl, ethylcyclohexyl and propenylcyclohexyl. As still other examples, R can be aryl or alkoxy such as benzyl, anthracyl, benzylethyl, ethoxy, cyclohexoxy, heptadecoxy, methoxypropyl, ethoxyethoxyethoxy and ethoxyethoxyethoxybutyl; also R' can be the acyl or dithiocarbonyl, including formyl, propionyl, acrylyl and oleyl. Representative accelerators include ethyl carbazate, t-butyl carbazate, rhodanine and N-amino rhodanine. The accelerator can be present in amounts of about 0.001 to 10 or more weight percent of the acrylate composition.

Representative peroxidic initiators include cumene hydroperoxide, t-butyl hydroperoxide, methylethylketone hydroperoxide, tetralin hydroperoxide, di-t-butyl peroxide, t-butyl peracetate and di-t-butyl diperphthalate. The initiator is generally present in amounts of about 0.05 to 10 or 20 percent or more by weight of the acrylate composition.

In another embodiment of the present invention, in the acrylate composition (f) defined above, the monomer can be prepared by the reaction of one mole for instance of isopropyl amine, n-butyl amine or cyanamide with two moles of glycidyl methacrylate. Generally, the monomer will be present in amounts of about 5 – 80 percent by weight of said composition.

Representative vinyl organic acids include acrylic and the lower alkyl acrylic acids, preferably methacrylic acid.

The initiator employed is t-butyl peracetate, di-t-butyl diperphthalate or t-butyl perbenzoate, present in amounts of about 1 – 3 percent by weight of said composition.

The trihydroxy benzene inhibitor, preferably pyrogallol is present in amounts of about 0.1 – 1.0 and preferably about 0.2 – 0.5 percent by weight of said composition.

The accelerator, benzhydrazide or N-aminorhodanine, is present in amounts of about 0.05 to 0.2 and preferably about 0.10 to 0.15 percent by weight of said acrylate composition.

If desired, the composition can also include as a stabilizer an ester prepared by reacting acrylic or lower alkyl acrylic acids with lower alkanols. The stablizer can be present in amounts of about 0 – 60 percent by weight of the total composition. Moreover, if desired a viscosity-increasing component such as dimeric and trimeric aliphatic organic acids having from 36 to 54 carbon atoms in amounts of 0 – 60 percent by weight of the total composition can be employed.

The inner bearing member of the present invention can have a bearing surface made of a member selected from the group consisting of metal and ceramic. Thus, when the inner bearing member is metal, it is preferably stainless steel (wrought or powder metallurgy) such as 440C, 17 – 4 pH and 304 17-4 pH although other metals such as case hardened titanium and anodized aluminum can also be employed. When a ceramic surface bearing member is employed generally it is in the form of a thin ceramic coating on a metal substrate. The ceramic coating must be sufficiently thin to permit a slight deformation thereof without fracturing so that stresses which would normally build up within the coating can be transferred to the substrate which has the greater tensile strength. Furthermore, the tensile strength of the substrate must be within a particular range. If the tensile strength is too low, the substrate will not provide proper support for the coating with the resulting deformation of the substrate under load, thereby causing fractures in the ceramic coating. If the tensile strength of the substrate is too high, the substrate will not provide a proper cushioning effect, surface stresses will not be transferred to the substrate and the coating will fracture or otherwise fail as a result of such stresses. In particular, it is found that the tensile strength of the substrate should lie within the range of 35,000 to 250,000 psi to achieve a proper balance between the tendency of the coating to fracture as a result of deformation and the tendency of the coating to fracture as a result of surface stresses. Also, the coating must have a thickness ranging between 0.0001 to 0.02 inch with a thickness of approximately 0.004 inch being preferred.

The use of titanium or a titanium-based alloy as a substrate is particularly desirable since this metal provides an especially good bond with the ceramic coating. In addition, this substrate material is more chemically inert than most materials which can be used, is light in weight and maintains its strength when subjected to relatively high temperatures approaching 800° F. Also, and perhaps most important, it has a coefficient of thermal expansion substantially equal to that of the various coating materials which may be used for the ceramic coating and, therefore, little or no stresses are built up on the coating as a result of differential expansion of the substrates and the coating when operating over a wide temperature range.

The material of the ceramic coating used on the substrate may vary widely. However, it has been found that coating materials made up predominately of one or the other of five specific base compounds provide particularly good results, especially in combination with a substrate of titanium or a titanium-based alloy such as alloys which, in addition to titanium, comprise 5 percent by weight of aluminum and 2.5 percent by weight of tin (Ti-5Al-2.5Sn) or 6 percent by weight of aluminum and 4 percent by weight of vanadium (Ti-6Al-4V). The five base compounds preferred for the coating materials are: chromium oxide ($Cr_2O_3$), titanium dioxide ($TiO_2$), aluminum oxide ($Al_2O_3$), titanium carbide (TiC) and tungsten carbide (WC). Each of these compounds can be used in substantially pure form or in combination with other additives intended to produce a more desirable coating or to facilitate the application of the coating to the substrate. Examples of mixtures which can be used are: (80 percent $Cr_2O_3$ + 20 percent NiCr), (TiC + 5 – 20 percent Ni), (50 percent WC + 35 percent NiCr + 15 percent NiAl) and (WC + 9 percent Co), where NiCr is made up of 80 percent Ni and 20 percent Cr and wherein the percentages given are volume percentages.

The inner bearing surface, prior to injection therearound of said molded outer bearing is provided with a coating of a parting or release agent. Representative of such agents are polytetrafluoroethylene, silicone, wax emulsion and the like, said parting agent being employed to protect against any adhesion between the inner bearing member and the outer bearing member during the fabrication of the latter.

In one embodiment of the present invention, the bearing assembly is produced by locating the inner bearing member within an outer housing member with the spacing therebetween being sufficient so that on injection of the mixture of the curable acrylate and particulate solid lubricant, no appreciable separation of the latter from the mixture is experienced. It has been observed that if the gap or spacing between the inner bearing member and the outer housing is too small, such a separation occurs, thereby creating a deficiency of particulate solid lubricant in that portion of the finished or molded outer bearing member which contacts or engages the inner bearing member. This adverse phenomenon causes a diminution of the otherwise highly favorable room and elevated temperature characteristics of the bearing assembly of this invention. Generally, the spacing between the inner bearing member and the outer housing will range between about 5 to 60 mils, although it will be recognized, that depending upon the ultimate use to which the bearing assembly is put, as well as the particular configuration of the bearing assembly chosen, the maximum dimension of the spacing can be even greater.

The moldable composition of the outer bearing member can be injected into the spacing between the inner bearing member and the outer housing member at a significantly lower pressure than heretofore considered feasible. Thus pressures as low as about 0.25 psi-50 can be employed. It will be recognized, however, that because of the flexibility in injection pressure offered by the moldable composition of this invention, higher pressures can be utilized if it is found convenient to do so, the point being that a minimum high pressure limitation (in the order of about 1000 psi) is not imposed on the present development. Further, the moldable outer bearing composition of the present invention is sufficiently flowable at ambient temperature that its injection at the stated low pressures can be effected at ambient temperature, thus eliminating the need for extraneous heating devices and controls to maintain the composition in a state suitable for injection at the stated low pressures.

If desired, the interior surface of the outer housing member can be treated to enhance the bonding of the moldable outer bearing composition therewith, such treatment including vapor blasting, chemical etching and the like. Importantly, however, it has been found that the moldable outer bearing member composition of this invention forms a bond with the outer housing sufficiently strong without the need of a mechanical key or lock through the outer housing member so that there is no relative movement between the outer housing member and the molded outer bearing member.

The bearing assembly, after injection of the moldable outer bearing member into the space between the inner bearing member and the outer housing member is then cured. When it is desired to take advantage of the anaerobic characteristics of the acrylate composition, curing can be effected in an inert atmosphere essentially free from an oxygen-containing gas for a period ranging from about ¼ to 24 hours at a temperature ranging from about ambient temperature to 325° F. On the other hand, when it is not desired to cure the acrylate composition under anaerobic conditions, it has been found the same can conveniently be cured in the presence of an oxygen-containing gas at a temperature ranging from about 100°–325° F. for a period ranging from about ¼ to 2 hours. Generally, the use of lower temperatures requires a somewhat longer cure time.

In another embodiment of the present invention, the outer bearing member can be produced by applying the curable acrylate composition in the form of a slurry to the inner surface of the outer housing member, curing the same under the conditions set forth above and subsequently machining the cured composition to the desired dimensions and tolerances.

The bearing assembly of the present invention exhibits long life and low wear characteristics, is self-lubricating and thus requires little or no servicing or maintenance, exhibits relatively high strength and load carrying characteristics. Further, unlike bearing assemblies utilizing nylon as a bearing member, the acrylate bearing member of the present invention exhibits no tendency to absorb moisture and thus is ideally suited for use in a moisture environment without any degradation of the bond created between the molded outer bearing member and the outer housing member.

Referring now to the drawings in which preferred embodiments of the invention are shown:

FIG. 3 is a fragmentary sectional view of one half of the bearing assembly of FIG. 2;

FIG. 5 is a perspective view of a rod end containing a bearing assembly embodying the present invention, parts of the rod end bearing assembly being broken away;

FIG. 6 is a vertical sectional view taken through the rod end of FIG. 5;

FIG. 7 is a fragmentary sectional view of one half of a bearing assembly construction illustrating another embodiment of the present invention;

FIG. 8 is a vertical sectional view of another bearing assembly embodiment of the present invention;

FIG. 9 is a vertical sectional view of a metal sleeve bearing made in accordance with the present invention;

FIG. 10 is a vertical sectional view of a rod bearing made in accordance with the present invention;

FIG. 11 is a vertical sectional view of a plastic sleeve bearing made in accordance with the present invention; and FIG. 12 is a fragmentary sectional view of a plate bearing made in accordance with the present invention.

Figure 1:
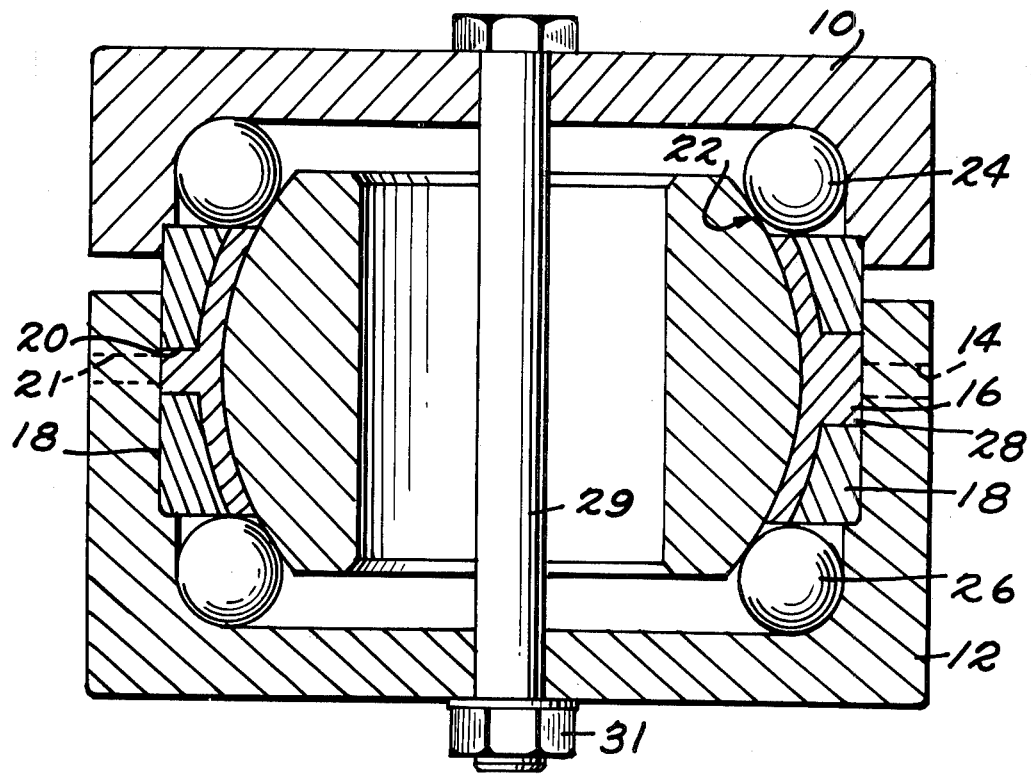
FIG. 1 is a sectional view illustrating the placement of the parts in a mold cavity to produce the bearing assembly of this invention.

FIG. 1 shows a mold in which the outer housing and inner bearing member are positioned during the injection of the curable acrylate composition into the clearance beteen the two members. The mold is comprised of upper and lower members 10 and 12, respectively, and is provided with filling orifice 14 which is in alignment with filling orifice 16 (approx. 0.08 inch in diameter) of the housing member 18. Located 180° from filling orifice 16 is vent orifice 20 (approx. 0.04 inch in diameter) in the housing member 18 aligned with vent orifice 21 of the mold. The inner bearing member 22 is centered within the housing member 18 by means of O-rings 24 and 26 to provide a clearance 28 therebetween. The mold members, the housing members and the centered inner bearing member can be retained in their relative positions by means of a bolt 29 passing through the base 10 and 12 of the assembly and fastened tight by nut 31. In forming the outer bearing member 30, the flowable mixture of curable acrylate composition and particulate solid lubricant is injected under relatively slight pressure at ambient temperature through the aligned filling orifices 14 and 16 to fill the clearance 28. This mixture can be injected into the clearance or cavity by means of a syringe and its introduction is continued until it is visibly ejected through the vent orifices 20 and 21. The acrylate composition is then cured either (1) by placing the total mold assembly into an enclosure maintained with an essentially oxygen gas-free environment and at a temperature ranging from ambient temperature to 325° F, for a period ranging from about ¼ to 24 hours or (2) by placing the mold assembly in an enclosure maintained with an oxygen-containing gas environment and at a temperature ranging from about 100°–325° F, for a period ranging from about ¼ to 2 hours.

Figure 2:
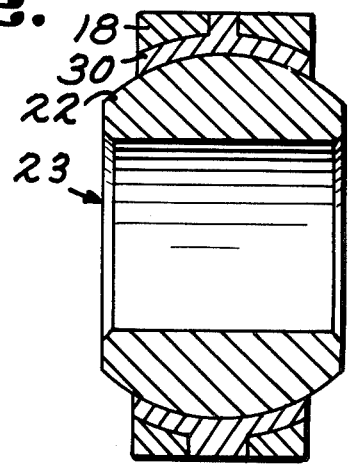
FIG. 2 is a sectional view of the bearing assembly of the invention.

FIG. 2 shows one embodiment of the bearing assembly 23 of the present invention after being cured and removed from the mold assembly and as can be seen in FIG. 3, the minimum inner diameter of the housing member 18 can be less than the maximum outer diameter of the inner bearing member 22.

Figure 4:
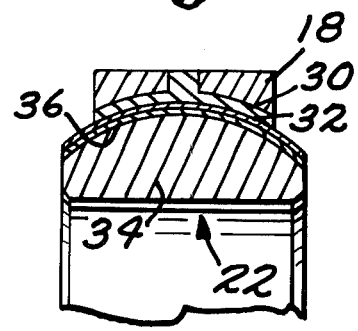
FIG. 4 is a fragmentary sectional view of the inner bearing member of the bearing assembly of this invention.

In FIG. 4 there is illustrated in detail the inner bearing member 22 having on the bearing surface engaging the molded outer bearing member 30 a thin film of parting or release agent 32 which is applied to the surface of the inner bearing member 22 prior to molding said outer bearing member thereabout. The inner bearing member 30 shown in FIG. 4 is one produced from a metal substrate 34 coated with a ceramic layer 36, each as hereinbefore defined.

FIGS. 5 and 6 show, by way of example, a rod end containing a bearing assembly of the present invention. The rod end is comprised of an externally threaded banjo 38 having a transverse bore which receives the bearing assembly of this invention, generally indicated at 23. The two coengaging and relatively slidable members of the bearing assembly consist of the inner ball member 22 and the outer molded plastic bearing member 30 which is in molded non-rotative engagement with outer housing member 18 which in turn is in fixed non-rotative engagement with the annular seating surface on the banjo 38 by swaging both sides of the housing member 18.

In use, the threaded portion of the banjo 38 is threadably connected with one mechanism part and another mechanism part is connected to the inner bearing member 22 by a connecting member inserted through its bore 29.

FIG. 7 shows another embodiment of the invention where the bearing assembly comprises an outer bearing housing 18, an outer molded plastic bearing 30, a split inner race 22 and an inner race through bushing 40. The outer plastic race 30 is molded between the housing 18 and inner bearing 22 in a manner essentially as described above so that while there is no relative movement between the outer bearing 30 and the outer race housing 18 there is relative movement between the outer bearing 30 and the inner bearing 22.

The inner side of the outer bearing 30 forms a pair of opposed annular bearing 30 forms a pair of opposed annular bearing surfaces 42 and 44 having concave spherical curvatures which cooperate with the inner bearing 22 to permit relative sliding movement between the inner and outer bearing members even though the bearing is subjected to radial, axial and moment loading individually or in combination.

The split inner bearing member 22 comprises two annular members 46 and 48. These annular members are formed with hardened metal or with metal substrates coated with a ceramic material as disclosed heretofore. In the preferred form, the substrates 50, 52 are titanium and the ceramic coatings 54, 56 are chromium oxide. The outer bearing surfaces 54, 56 of each member 46, 48 of the inner bearing 22 are complementary to the annular bearing surfaces 42, 44 of the outer bearing 30 having spherical curvatures whereby the coengaging surfaces co-operate to form a bearing capable of absorbing radial, axial and moment loading individually or in combination.

The members 46 and 48 of the split inner bearing 22 are held in contact with the bearing surfaces 42, 44 of the outer bearing member 30 means of a cylindrical bushing 40 which has an integral shoulder 58 at one end and a snapping or similar locking means 60 on the other end to retain the members on the bushing. The split inner bearing is press fit, bonded or otherwise secured to bushing 40 to prevent relative movement between the bushing and the inner bearing. It will be appreciated that complimentary conical rather than sperically curved bearing surfaces can be provided and than means equivalent to the split bearing bushing means 40 can also be utilized.

FIG. 8 shows another embodiment of the invention where the bearing assembly comprises an outer bearing housing 62, an outer molded plastic bearing 64 and an inner bearing member 66 which can comprise a thrust washer or ring mechanically locked in placed. The outer plastic bearing 64 is molded between the housing 62 and the inner bearing 66 in a manner essentially as described above so that while there is no relative movement between the outer bearing 64 and the outer bearing housing 62 there is relative movement between the outer bearing 64 and the inner bearing 66.

FIG. 9 shows as another embodiment of the invention a hollow cylindrical sleeve bearing 68, the internal surface 70 of the hollow cylindrical backing member 72 being provided with a plastic bearing member 74, there being no relative movement between bearing member 74 and the internal surface 70 of the backing member 72. The plastic bearing member 74 can be applied to the internal surface 70 of the sleeve bearing backing member 72 by any convenient means, such as by molding the same thereto, or by coating the internal surface by spreading or spraying the acrylate composition onto the said internal surface. If desired, after the acrylate composition has cured, the same can be machined to the desired dimension.

FIG. 10 shows another embodiment of solid cylindrical sleeve bearing 76, the external surface 78 of the solid cylindrical backing member 80 being provided with a plastic bearing member 82. Again there is no relative movement between the plastic bearing member 82 and the external surface 78 of the backing member 80. The plastic bearing member 82 can be applied to the external surface of the sleeve bearing backing member 80 also by a molding technique or by spraying, dipping or spreading the acrylate composition onto said external surface. Obviously other conventional coating techniques can also be employed. Again the desired thickness of the plastic bearing member 74 can be achieved by machining the same.

FIG. 11 shows a hollow cylindrical sleeve bearing 84 similar to that of FIG. 9. The internal surface 86 of the hollow cylindrical backing member 88 is provided with a plastic bearing member 90 comprising the cured acrylate composition of this invention. The hollow cylindrical backing member 88 in this instance can be, for instance, a cured phenolic resin or the like and the bearing can be made in a manner outlined above.

FIG. 12 shows a plate bearing 92, the substrate 94 being provided on at least one planar surface 96 thereof with a plastic bearing member 98 comprising the cured acrylate composition of this invention. Again this plastic bearing member 98 can be provided on the planar surface 96 by any conventional means and can be machined, if desired to the desired dimensions.

What is claimed is:

1. A shaped bearing member, comprising a cured mixture of an acrylate composition and particulate solid lubricant, said acrylate composition being selected from the group consisting of:

a. a mixture of a major amount of a liquid acrylic ester selected from the group consisting of di-, tri- and tetraesters of an acrylic acid and a polyhydric alcohol, a minor amount of a low molecular weight prepolymer of an ester of a low molecular weight prepolymer of an ester of a low molecular weight alcohol having a terminal vinyl group and an aromatic polycarboxylic acid in solution in said acrylic ester and an organic amide of the formula

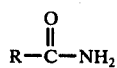

wherein R is selected from the group consisting of hydrogen and aliphatic hydrocarbon of 1-20 carbon atoms in an amount sufficient to copolymerize said acrylic ester and prepolymer, b. a mixture of acrylic ester monomer, a peroxidic initiator in an amount sufficient to initiate polymerization of said monomer and an aminoalkoxyalkylamine of the formula $R_1\text{---}N(H)R_2\text{---}[OR_3]_xN(H)R_4$ wherein $x$ is an integer of 1-6 inclusive, each of $R_1$ and $R_4$ is selected from the group consisting of hydrogen and lower alkyl and each of $R_2$ and $R_3$ is a lower alkyl linking bridge between N and O, in an amount sufficient to accelerate the polymerization of said monomer, c. a mixture of an acrylic ester of an alkyl amino alcohol and an effective amount of a hydroperoxide catalyst, said acrylic ester having the formula

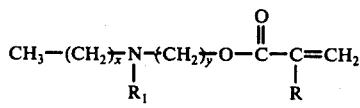

wherein $x$ is an integer of 0-5 inclusive, $y$ is an integer of 1-6 inclusive, R is selected from the group consisting of hydrogen, halogen, hydroxy, cyano and lower alkyl and $R_1$ is selected from the group consisting of hydrogen and alkyl having 1-6 carbon atoms, d. a mixture of a liquid acrylic ester monomer selected from the group consisting of diesters of an acrylic acid and a polyhydric alcohol, acrylic esters of cyclic ether alcohols, acrylic esters of amino alcohols and mixtures thereof, a peroxidic initiator and an oxyalkylamine of the formula $(H)_mN[(CH_2)_x(OR_1)_yOR_2]_n$ wherein $m$ and $n$ are each integers of 1 to 2 inclusive, the total of $m$ and $n$ is 3, $x$ is an integer of 1 to 6 inclusive, $y$ is an integer of 0 to 6 inclusive, $R_1$ is lower alkyl and $R_2$ is hydrogen or lower alkyl, e. a mixture of an acrylic ester monomer selected from the group consisting of di-, tri- and tetraesters of an acrylic acid and a polyhydric alcohol, acrylic esters of cyclic ether alcohols, acrylic esters of amino alcohols and mixtures thereof, a peroxidic initiator in an amount sufficient to initiate polymerization of said monomer and a member selectd from the group consisting of rhodanine and a hydrazide of the formula

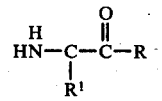

wherein R and $R^1$ are selected from separate groups and an interconnected group forming a cyclic ring, R is further released from the group consisting of hydrogen, alkyl, cycloalkyl, aryl and alkoxy and $R^1$ is selected from the group consisting of hydrogen, alkyl, cycloalkyl, acyl and dithiocarbonyl in an amount sufficient to accelerate the polymerization of said monomer; said f. a mixture of a monomer of the formula

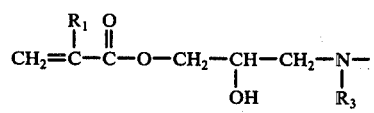

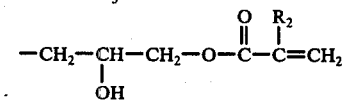

wherein $R_1$ and $R_2$ are selected from the group consisting of hydrogen and lower alkyl and $R_3$ is selected from the group consisting of lower alkyl, lower hydroxyalkyl, cyano and lower cyanoalkyl; at least one equivalent of an acid for each equivalent of said monomer, said acid being selected from the group consisting of acrylic acid and lower alkyl acrylic acids; an initiator selected from the group consisting of t-butyl perbenzoate, t-butyl peracetate and di-t-butyl diperphthalate, said initiator being present in an amount sufficient to initiate the polymerization of said monomer; a trihydroxy benzene inhibitor and an accelerator selected from the group consisting of benzhydrazide and N-aminorhodanine.

2. A method of producing a molded bearing assembly comprising two coengaging members movable relative to one another, the first of said members having a bearing surface selected from the group consisting of metal and ceramic and the bearing surface of said other member comprising a molded mixture of an acrylate composition and particulate solid lubricant, the bearing surface of said first member being coated with a thin film of a parting agent to prevent adhesion thereof to said molded bearing surface, the steps comprising coating said first bearing member with a thin film of a parting agent, applying a curable mixture of said acrylate composition and particulate solid lubricant to the parting agent coated first bearing member and curing said mixture in the absence of an oxygen-containing gas at a temperature ranging from ambient temperature to 325° F, thereby producing said other member and said molded bearing assembly, said acrylate composition being selected from the group consisting of:

a. a mixture of a major amount of liquid acrylic ester selected from the group consisting of di-, tri- and tetraesters of an acrylic acid and a polyhydric alcohol, a minor amount of a low molecular weight prepolymer of an ester of a low molecular weight alcohol having a terminal vinyl group and an aromatic polycarboxylic acid in solution in said acrylic ester and an organic amide of the formula

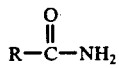

wherein R is selected from the group consisting of hydrogen and aliphatic hydrocarbon of 1-20 carbon atoms in an amount sufficient to copolymerize said acrylic ester and prepolymer, b. a mixture of acrylic ester monomer, a peroxidic initiator in an amount sufficient to initiate polymerization of said monomer and an aminoalkoxyalkylamine of the formula $R_1$—$N(H)R_2[OR_3]_xN(H)R_4$ wherein $x$ is an integer of 1-6 inclusive, each of $R_1$ and $R_4$ is selected from the group consisting of hydrogen and lower alkyl each of $R_2$ and $R_3$ is a lower alkyl linking bridge between N and O, in an amount sufficient to accelerate the polymerization of said monomer, c. a mixture of an acrylic ester of an alkyl amino alcohol and an effective amount of a hydroperoxide catlyst, said acrylic ester having the formula

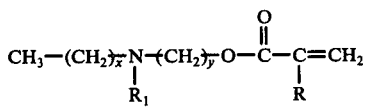

wherein $x$ is an integer of 0-5 inclusive, $y$ is an integer of 1-6 inclusive, R is selected from the group consisting of hydrogen, halogen, hydroxy, cyano and lower alkyl and $R_1$ is selected from the group consisting of hydrogen and alkyl having 1-6 carbon atoms, d. a mixture of a liquid acrylic ester monomer selected from the group consisting of diesters of an acrylic acid and a polyhydric alcohol, acrylic esters of cyclic ether alcohols, acrylic esters of amino alcohols and mixtures thereof, a peroxidic initiator and an oxyalkylamine of the formula $(H)_mN[(CH_2)_x(OR_1)_yOR_2]_n$ wherein $m$ and $n$ are each integers of 1 to 2 inclusive, the total of $m$ and $n$ is 3, $x$ is an integer of 1 to 6 inclusive, $y$ is an integer of 0 to 6 inclusive, $R_1$ is lower alkyl and $R_2$ is hydrogen or lower alkyl;

e. a mixture of an acrylic ester monomer selected from the group consisting of di-, tri- and tetraesters of an acrylic acid and a polyhydric alcohol, acrylic esters of cyclic ether alcohols, acrylic esters of amino alcohols and mixture thereof, a peroxidic initiator of an amount sufficient to initiate polymerization of said monomer and a member selected from the group consisting of rhodanine and a hydrazide of the formula

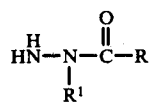

wherein R and $R^1$ are selected from separate groups and an interconnected group forming a cyclic ring, R is further selected from the group consisting of hydrogen, alkyl, cycloalkyl, aryl and alkoxy and $R^1$ is selected from the group consisting of hydrogen, alkyl, cycloalkyl, acyl and dithiocarbonyl in an amount sufficient to accelerate the polymerization of said monomer; and f. a mixture of a monomer of the formula

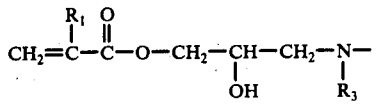

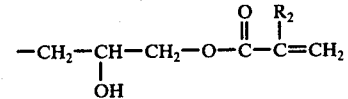

wherein $R_1$ and $R_2$ are selected from the group consisting of hydrogen and lower alkyl and $R_3$ is selected from the group consisting of lower alkyl, lower hydroxyalkyl, cyano and lower cyanoalkyl; at least one equivalent of an acid for each equivalent of said monomer, said acid being selected from the group consisting of acrylic acid and lower alkyl acrylic acids; an initiator selected from the group consisting of t-butyl perbenzoate, t-butyl peracetate and di-t-butyl diperphthalate, said initiator being present in an amount sufficient to initiate the polymerization of said monomer; a trihydroxy benzene inhibitor and an accelerator selected from the group consisting of benzhyrazide and N-aminorhodanine.

3. A method of producing a molded bearing assembly comprising two coengaging members movable relative to one another, the first of said members having a bearing surface selected from the group consisting of metal and ceramic and the bearing surface of said other member comprising a molded mixture of an acrylate composition and particulate solid lubricant, the bearing surface of said first member being coated with a thin film of a parting agent to prevent adhesion thereof to said molded bearing surface, the steps comprising coating said first bearing member with a thin film of a parting agent, applying a curable mixture of said acrylate composition and particulate solid lubricant to the parting agent coated first bearing member and curing said mixture in the presence of an oxygen-containing gas at a temperature ranging from about 100°-325° F, thereby producing said other member and said molded bearing assembly, said acrylate composition being selected from the group consisting of:

a. a mixture of a major amount of a liquid acrylic ester selected from the group consisting of di-, tri- and tetraesters of an acrylic acid and a polyhydric alcohol, a minor amount of a low molecular weight prepolymer of an ester of a low molecular weight alcohol having a terminal vinyl group and an aromatic polycarboxylic acid in solution in said acrylic ester and an organic amide of the formula

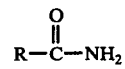

wherein R is selected from the group consisting of hydrogen and aliphatic hydrocarbon of 1-20 carbon atoms in an amount sufficient to copolymerize said acrylic ester and prepolymer, b. a mixture of acrylic ester monomer, a peroxidic initiator in an amount sufficient to initiate polymerization of said monomer and an aminoalkoxyalkylamine of the formula $R_1$—$N(H)R_2[OR_3]_xN(H)R_4$ wherein $x$ is an integer of 1-6 inclusive, each of $R_1$ and $R_4$ is consiting of hydrogen and lower alkyl and each of $R_2$ and $R_3$ is a lower alkyl linking bridge between N and O, in an amount sufficient to accelerate the polymerization of said monomer, c. a mixture of an acrylic ester of an alkyl amino alcohol and an effective amount of a hydroperoxide catalyst, said acrylic ester having a formula

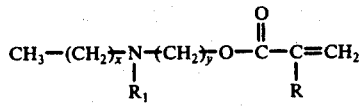

wherein $x$ is an integer of 0-5 inclusive, $y$ is an integer of 1-6 inclusive, R is selected from the group consisting of hydrogen, halogen, hydroxy, cyano and lower alkyl and $R_1$ is selected from the group consisting of hydrogen and alkyl having 1-6 carbon atoms, d. a mixture of a liquid acrylic ester monomer selected from the group consisting of diesters of an acrylic acid and a polyhydric alcohol, acrylic esters of cyclic ether alcohols, acrylic esters of amino alcohols and mixtures thereof, a peroxidic initiator and an oxyalkylamine of the formula $(H)_m N[(CH_2)_x(OR_1)_y OR_2]_n$ wherein $m$ and $n$ are each integers of 1 to 2 inclusive, the total of $m$ and $n$ is 3, $x$ is an integer of 1 to 6 inclusive, $y$ is an integer of 0 to 6 inclusive, $R_1$ is lower alkyl and $R_2$ is hydrogen or lower alkyl, e. a mixture of an acrylic ester monomer selected from the group consisting of di-, tri- and tetraester of an acrylic acid and a polyhydric alcohol, acrylic esters of cyclic ether alcohols, acrylic esters of amino alcohols and mixtures thereof, a peroxidic initiator of an amount sufficient to initiate polymerization of said monomer and a member selected from the group consisting of rhodanine and a hydrazide of the formula

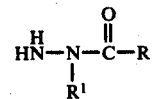

wherein R and $R^1$ are selected from separate groups and an interconnected group forming a cyclic ring, R is further selected from the group consisting of hydrogen, alkyl, cycloalkyl, aryl and alkoxy and $R^1$ is selected from the group consisting of hydrogen, alkyl, cycloalky, acyl and dithiocarbonyl in an amount sufficient to accelerate the polymerization of said monomer; and f. a mixture of a monomer of the formula

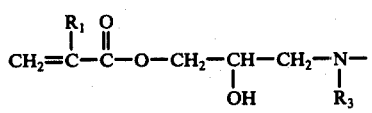
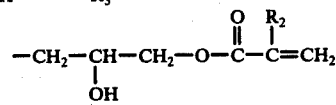

wherein $R_1$ and $R_2$ are selected from the group consisting of hydrogen and lower alkyl and $R_3$ is selected from the group consisting of lower alkyl, lower hydroxyalkyl, cyano and lower cyanoalkyl; at least one equivalent of an acid for each equivalent of said monomer, said acid being selected from the group consisting of acrylic acid and lower alkyl acrylic acids; an inititator selected from the group consisting of t-butyl perbenzoate, t-butyl peracetate and di-t-butyl diperphthalate, said initiator being present in an amount sufficient to initiate the polymerization of said monomer; a trihydroxy benzene inhitiator and an accelerator selected from the group consisting of benzhydrazide and N-aminorhodanine.

* * * * *